United States Patent
Ye et al.

(10) Patent No.: US 11,183,840 B2
(45) Date of Patent: Nov. 23, 2021

(54) MULTI-TIME SCALE ENERGY STORAGE MANAGEMENT FRAMEWORK FOR PERFORMANCE-BASED FREQUENCY REGULATION (FR) MARKET

(71) Applicant: Hitachi, Ltd., Tokyo (JP)

(72) Inventors: Yanzhu Ye, San Jose, CA (US); Bo Yang, Santa Clara, CA (US); Panitarn Chongfuangprinya, San Jose, CA (US); Sumito Tobe, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 200 days.

(21) Appl. No.: 16/449,054

(22) Filed: Jun. 21, 2019

(65) Prior Publication Data

US 2020/0403403 A1 Dec. 24, 2020

(51) Int. Cl.
| | |
|---|---|
| *G05B 15/02* | (2006.01) |
| *H02J 3/00* | (2006.01) |
| *H01M 10/44* | (2006.01) |
| *H01M 10/42* | (2006.01) |

(52) U.S. Cl.
CPC ............ *H02J 3/00* (2013.01); *G05B 15/02* (2013.01); *H01M 10/4285* (2013.01); *H01M 10/44* (2013.01); *G05B 2219/2639* (2013.01); *H02J 2203/20* (2020.01)

(58) Field of Classification Search
CPC .... H02J 3/00; H02J 2203/20; H01M 10/4285; H01M 10/44; H01M 10/425; H01M 2010/4271; G05B 15/02; G05B 2219/2639; G06Q 30/06; G06Q 10/04; G06Q 50/06
See application file for complete search history.

(56) References Cited

U.S. PATENT DOCUMENTS

| | | | |
|---|---|---|---|
| 2005/0017686 A1* | 1/2005 | Sakakibara | G01R 31/392 320/132 |
| 2014/0266061 A1* | 9/2014 | Wachal | H02J 7/0068 320/134 |
| 2016/0042369 A1 | 2/2016 | Asghari et al. | |
| 2017/0038786 A1* | 2/2017 | Asghari | G05F 1/66 |

* cited by examiner

*Primary Examiner* — Yuhui R Pan
(74) *Attorney, Agent, or Firm* — Procopio, Cory, Hargreaves & Savitch LLP

(57) ABSTRACT

The multi-time scale battery energy/storage system (BES) management framework proposed in the present disclosure can be used for day-ahead capacity scheduling and real-time BES operation control in the latest performance-based frequency regulation market. This multi-time scale BES management framework includes three control layers: long-term battery performance planning layer, day-ahead regulation capacity scheduling layer, real-time battery operation control layer. These three layers will coordinate with each other, and operate at different time scales.

12 Claims, 20 Drawing Sheets

FIG. 17(a) – Fuzzy-logic rule – 1

FIG. 17(b) – Fuzzy-logic rule – 2

| $AGC_i$ \ $SoC_i$ | PB | PS | Zero | NS | NB |
|---|---|---|---|---|---|
| PB | Zero | Zero | Zero | PS | NB |
| PS | Zero | Zero | Zero | PS | PM |
| Zero | Zero | NS | Zero | PS | PS |
| NS | NS | NS | Zero | Zero | Zero |
| NB | NM | NS | Zero | Zero | Zero |

$N_i$ is Zero (SoC keep balance)

FIG. 17(c) – Fuzzy-logic rule – 3

| $AGC_i$ \ $SoC_i$ | PB | PS | Zero | NS | NB |
|---|---|---|---|---|---|
| PB | Zero | PS | Zero | PM | NB |
| PS | Zero | Zero | PS | PM | PB |
| Zero | Zero | Zero | PS | PS | PB |
| NS | NM | NS | Zero | Zero | PS |
| NB | NM | NM | NS | Zero | Zero |

$N_i$ is Negative Big (SoC increase)

FIG. 17(d) – Fuzzy-logic rule 4

| $\Delta SoC_r$ \ $SoC_r$ | PB | PS | Zero | NS | NB |
|---|---|---|---|---|---|
| PB | Zero | Zero | Zero | NM | NB |
| PS | Zero | Zero | Zero | NS | NM |
| Zero | PS | PS | Zero | NS | NS |
| NS | PM | PS | Zero | Zero | Zero |
| NB | PB | PM | PS | Zero | Zero |

$V_r$ is Negative Small (SoC increase)

FIG. 17(e) - Fuzzy-logic rule - 5

MULTI-TIME SCALE ENERGY STORAGE MANAGEMENT FRAMEWORK FOR PERFORMANCE-BASED FREQUENCY REGULATION (FR) MARKET

BACKGROUND

Field

The present disclosure is generally directed to energy storage systems, and more specifically, to systems and methods for facilitating multi-time scale energy storage management for energy storage systems.

Related Art

Energy storage systems (ESS), especially battery energy/storage systems (BES) have become important assets in electrical grids, particularly in facilitating the effective integration of renewable energy and various distributed energy resources (DERs) into an electrical grid. The ESS is capable of providing various applications, from behind-the-meter to the grid-scale applications. The largest obstacle that prevents the battery storage system from large scale commercial implementation is the relatively high-investment cost and unclear revenue streams. Meanwhile considering the declining cost of BES, it is important to further explore the economic benefits of BES and the opportunities to achieve cost-benefit balances.

Currently one major application for BES is to provide frequency regulation (FR) service in the wholesale electrical market. There are regulations from the Federal Energy Regulatory Commission (FERC) that require market operators to develop pay-for-performance rules and tariffs, which compensate regulation providers based on their actual performances. For example, there is a performance-based regulation mechanism in which regulation service providers receive a two-part payment involving a capacity payment and performance payment. Meanwhile, a new fast regulation signal is also introduced that brings higher performance revenue than a traditional signal for eligible resources. The fast response of battery storage systems and their quality in tracking the AGC (Automatic Generation Control) signal makes them an attractive resource for providing regulation services, compared with other traditional resources.

In one related art implementation, there is the management of grid-scale energy storage systems that relates generally to management of grid scale energy storage units and more particularly, to management of grid-scale Energy Storage Systems (GSSs) unit operations in energy and frequency regulation markets in the present of frequency regulation uncertainties. The management system generates a schedule for a GSS unit by performing co-optimization using the optimal capacity deployment factors, the co-optimization including tracking upper and/or lower bounds on a state of charge (SoC) and including the bounds as hard constraints; and calculating risk indices based on the optimal scheduling for the GSS unit, and outputting an optimal GSS schedule if risk constraints are satisfied.

In another related art implementation, there is a dynamic co-optimization management for grid scale energy storage system market participation which involves a system and method for controlling operation of one or more grid scale energy storage systems (GSESSs). The method includes generating at least one time series model to provide forecasted pricing data for a plurality of markets, determining a reserve capacity for the one or more GSESSs to provide one or more real-time operation services, determining battery life and degradation costs for one or more batteries in the one or more GSESSs to provide battery life and degradation costs, and optimizing bids for the plurality of markets to generate optimal bids based on at least one of the forecasted pricing data, the battery life and degradation costs and the reserve capacity.

SUMMARY

For the FR market participation, a BES management framework is needed to determine the day-ahead capacity scheduling and real-time control of BES operation. The BES management problem is multi-time scale in nature, which takes into consideration multiple variables, e.g. storage physical constraints, operation limits, the forecasting uncertainty, market operation rules, and so on. Meanwhile, considering the limited BES life cycles, which is greatly impacted by the storage use patterns, an optimal control problem should also be formulated to consider the tradeoff between battery degradation and BES operation performance.

Example implementations described herein involve a multi-time scale battery energy management framework for the performance-based FR market. The features of this can involve a multi-time scale BES management system for performance-based FR market participation, including long-term BES performance monitoring, day-ahead regulation capacity scheduling, real-time battery operation control. The whole-scale optimization problem is structured into different layer covering different time spans, and solved iteratively, which reduces the computational complexity.

In example implementations, there can be different control layers targets on different issues. Information can be designed to be exchanged between different layers. Further, different control layers will run at different operation rates, or triggered by events. The long-term BES performance monitoring layer keeps track of BES life cycles. The related BES performance degradation information is scheduled to be updated to the day-ahead capacity scheduling layer once every day, or triggered by events (e.g. dramatic BES degradation are identified, or significant operation failure rates are identified). The day-ahead regulation capacity scheduling is executed daily. The capacity scheduling may re-run hourly when needed depending on specific regulation market rules. The real-time BES operation control layer operates at high rate, dynamically adjusting the requested regulation power signal sent by the market operators based on actual system status and predictions.

In example implementations, the management framework is adjustable and compatible with actual FR market rules, which takes performance-based regulation mechanisms into account and facilitates adjustable parameters fitting different FR market rules.

In example implementations, the battery degradation level is monitored, and is factored into different control layers, to effectively maintain the battery lifecycles while maximize operation revenue from FR market.

Example implementations involve a data-driven or measurement-based approach instead of complicated mathematical model-based approach. In example implementations, temporal feature extraction of FR signal is performed, and applied into BES scheduling optimization and real-time operation control. The storage system operation status and regulation performance score are kept monitored/analyzed, and applied in system control, or control policy adjustment in accordance with the desired implementation.

The example implementations described herein address problems in the related art implementations in that the related art implementations are not a complete multi-time scale BES management system. The related art implementations can only serve as daily BES scheduling/planning tools and do not accommodate performance-based FR market rules. Due to the regulation rule changes, the current FR market is switching to performance-based market rules. The actual regulation performance will greatly affect the economic compensation gained from regulation market participation, so it can be important to manage the battery operation in a way that the operation performance is guaranteed. Further, battery degradation impact is not considered in the BES management system of the related art.

Aspects of the present disclosure can involve a battery system management method, which involves executing a first process periodically to determine an effective capacity of the battery system; executing a second process configured to provide a schedule of usage of the battery system to one or more operators based on the effective capacity, market conditions, and operation constraints; and executing a third process in real time configured to control the battery system according to the schedule, battery status in real time, and signals provided from the one or more operators.

Aspects of the present disclosure can involve a computer program, storing instructions for executing a process to manage a battery system, the instructions involving executing a first process periodically to determine an effective capacity of the battery system; executing a second process configured to provide a schedule of usage of the battery system to one or more operators based on the effective capacity, market conditions, and operation constraints; and executing a third process in real time configured to control the battery system according to the schedule, battery status in real time, and signals provided from the one or more operators. The computer program may be stored on a non-transitory computer readable medium and executed by one or more processors.

Aspects of the present disclosure can involve a battery system management system, which involves means for executing a first process periodically to determine an effective capacity of the battery system; means for executing a second process configured to provide a schedule of usage of the battery system to one or more operators based on the effective capacity, market conditions, and operation constraints; and means for executing a third process in real time configured to control the battery system according to the schedule, battery status in real time, and signals provided from the one or more operators.

Aspects of the present disclosure can involve an apparatus configured to manage a battery system, the apparatus involving a processor, configured to execute a first process periodically to determine an effective capacity of the battery system; execute a second process configured to provide a schedule of usage of the battery system to one or more operators based on the effective capacity, market conditions, and operation constraints; and execute a third process in real time configured to control the battery system according to the schedule, battery status in real time, and signals provided from the one or more operators.

BRIEF DESCRIPTION OF DRAWINGS

FIGS. 17(a) to 17(e) illustrate an example set of the "if-then" fuzzy rules, in accordance with an example implementation.

DETAILED DESCRIPTION

Figure 1:
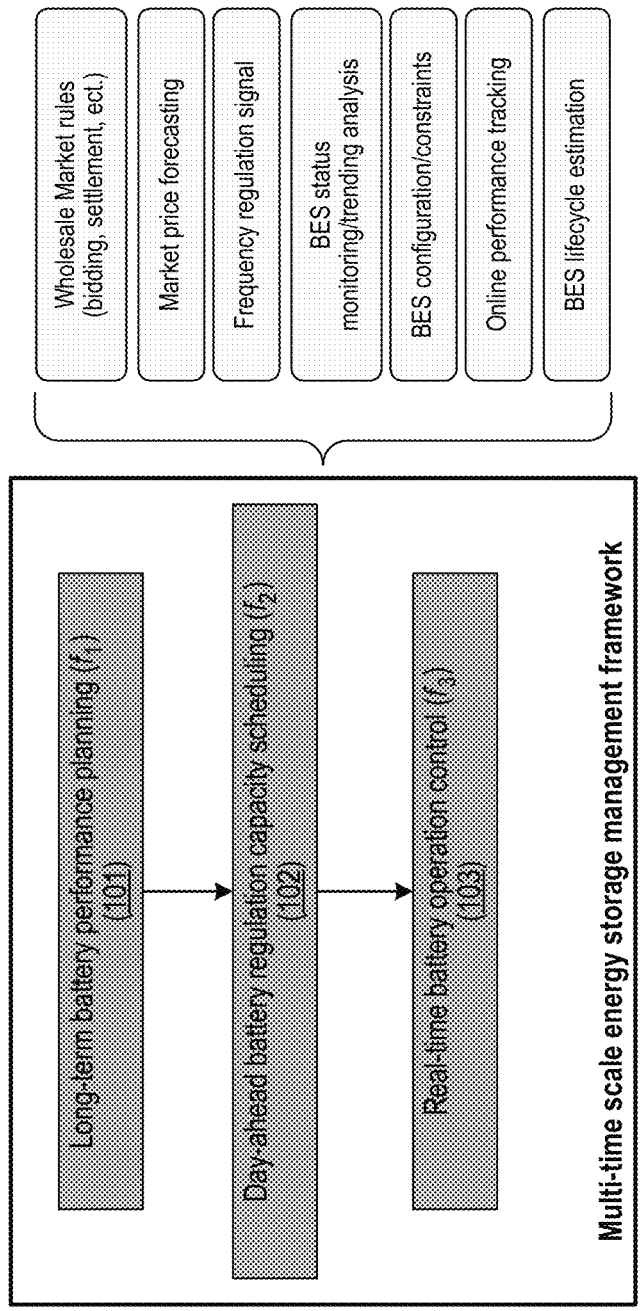
FIG. 1 illustrates a multi-layer energy storage management framework for market participation, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a multi-layer energy storage management framework for market participation, in accordance with an example implementation. The proposed multi-time scale BES management framework includes a set of decision-making processes (e.g. the long-term battery performance monitoring 101, the day-ahead hourly battery regulation capacity scheduling 102, the real-time BES operation control 103, and so on). The BES management framework is decomposed into different layers covering different time scales, and solved iteratively. The multi-layer management framework, as shown in FIG. 1, is developed in such a way that the different control layer will coordinate with each other while operating at different time scales. The operation frequency for the three layers are referred to as $f_1$, $f_2$, $f_3$, when $f_3 > f_2 > f_1$.

Long-Term BES Performance Planning (101)

Monitoring the long-term impacts of short-term battery operation in regulation market on BES's lifespan is the focus of this layer. In order to maximize the total operation revenue of BES over its entire lifespan, short-term battery scheduling/operation strategy needs to be adjusted in a way that short-term operation revenue and long-term battery degradation are well balanced.

The BES lifespan is highly dependent on its daily operation schedule. Usually the DoD (Depth of Discharge) level and the frequent cycling number in short-term BES regulation dispatching are the main factors affecting battery degradation level. BES short-term operation strategy mainly includes the day-ahead regulation capacity scheduling and real-time BES operation control, and so on. On the long-term battery performance monitoring/planning layer, the constrained-based method will be used to address the relationship between short-term BES operation scheduling and long-term BES performance planning.

Figure 2:
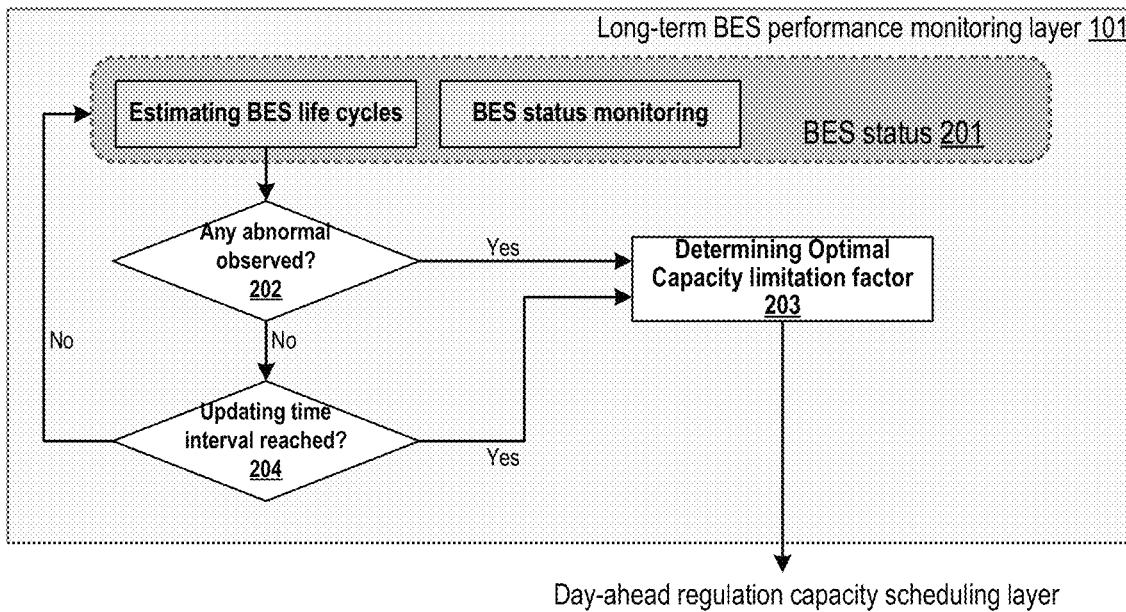
FIG. 2 illustrates an example flow diagram executed by the long-term BES performance planning layer, in accordance with an example implementation.

FIG. 2 illustrates an example flow diagram executed by the long-term BES performance planning layer, in accordance with an example implementation. As shown in FIG. 2, some limiting factors will be calculated and updated from the long-term battery performance planning layer 101, then be passed into the short-term scheduling layer 102 to adjust the scheduling strategy. The long-term BES performance monitoring layer 101 conducts calculation of limiting factors. At 202, a determination is made as to whether an abnormal condition is observed. If so (Yes), then the flow proceeds to 203 to determine the optimal capacity limitation factor (e.g., effective capacity), otherwise (No) the flow proceeds to 204 to determine if the updating time interval is reached. If so (Yes), then the flow proceeds to 203, otherwise (No) the flow proceeds to 201 to continuously monitor/track BES operation status.

The capacity limiting factor $\mu$ determined at the flow of 203 reflects the BES capacity degradation level caused by long-term BES daily operation. This dynamic capacity limiting factor will be passed into the other layers and affect the scheduling or operation constraints, which will be addressed in next sections. This limiting factor is mainly used to adjust the maximum capacity the BES can commit in frequency regulation, since the effective BES capacity will gradually degrade along with battery daily operation. The enforcement of the capacity limiting factor in BES scheduling layer will prevent from over-utilizing BES which will significantly affect its lifecycle, and prevent from over-committing energy capacity in FR market which will affect its regulation performance The capacity limitation factor $\mu$ is a function of estimated battery life cycles ($\gamma_{est}$) as described in Eq. 1.

$$\mu = f(\gamma_{est}(t), \gamma_{rated}) \qquad \text{Eq. 1}$$

Where $\gamma_{est}(t)$ is the estimated BES life cycles at time t, and $\gamma_{rated}$ is the rated battery life cycle available in manufacturer datasheet. The capacity limitation factor $\mu$ is normalized to be in the range of (0,1).

An example formulation of $f(\ )$ in Eq. 1 can be obtained through curve fitting based on a manufacturer datasheet to simulate the battery capacity degradation along with battery cycle operation.

Figure 3:
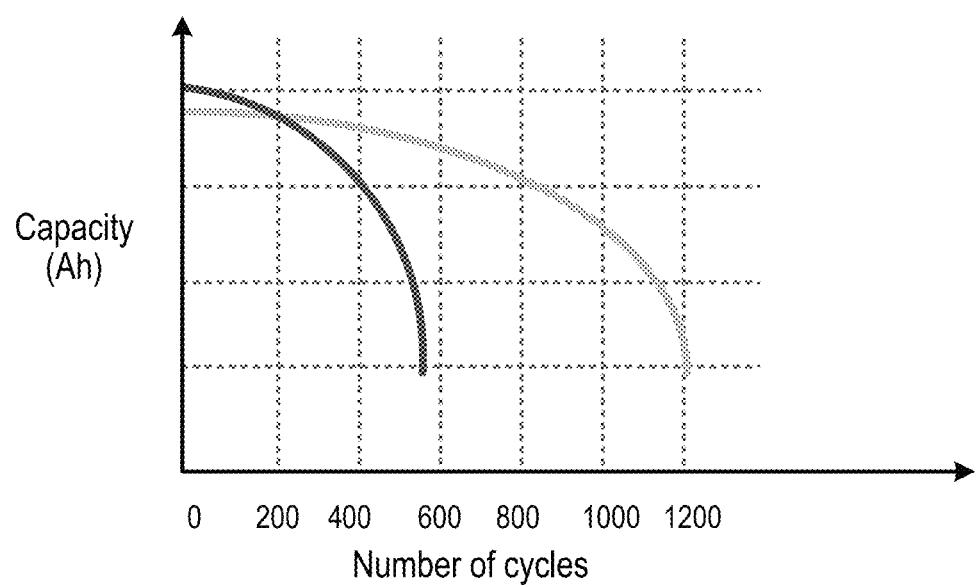
FIG. 3 illustrates an example curve of battery capacity versus cycle number, in accordance with an example implementation.

FIG. 3 illustrates an example curve of battery capacity versus cycle number, in accordance with an example implementation. Since the battery degradation is the long-term effect of daily operation, the capacity limitation factor $\mu(t)$ will be updated at a much lower frequency $f_1$, e.g. hourly or daily. The updating rate can be flexibly adjusted based on different scenarios. Further, the forced updating mechanisms of the flow at 203 and 204 are designed such that the parameter updating are triggered by certain pre-defined events as determined from the BES status (e.g. when dramatic battery degradation is detected, or battery abnormal operation is detected, and so on).

Day-Ahead Regulation Capacity Scheduling (102)

The short-term BES regulation capacity scheduling layer (102) is configured to optimize the hourly capacity commitment schedule for the next 24 hours, or other time horizon, depending on specific market rules in different Independent System Operator/Transmission System Operator (ISO/TSO) markets. The optimization objective is to maximize the operation revenue, meanwhile reduce the SoC violation risk and improve battery life.

Figure 4:
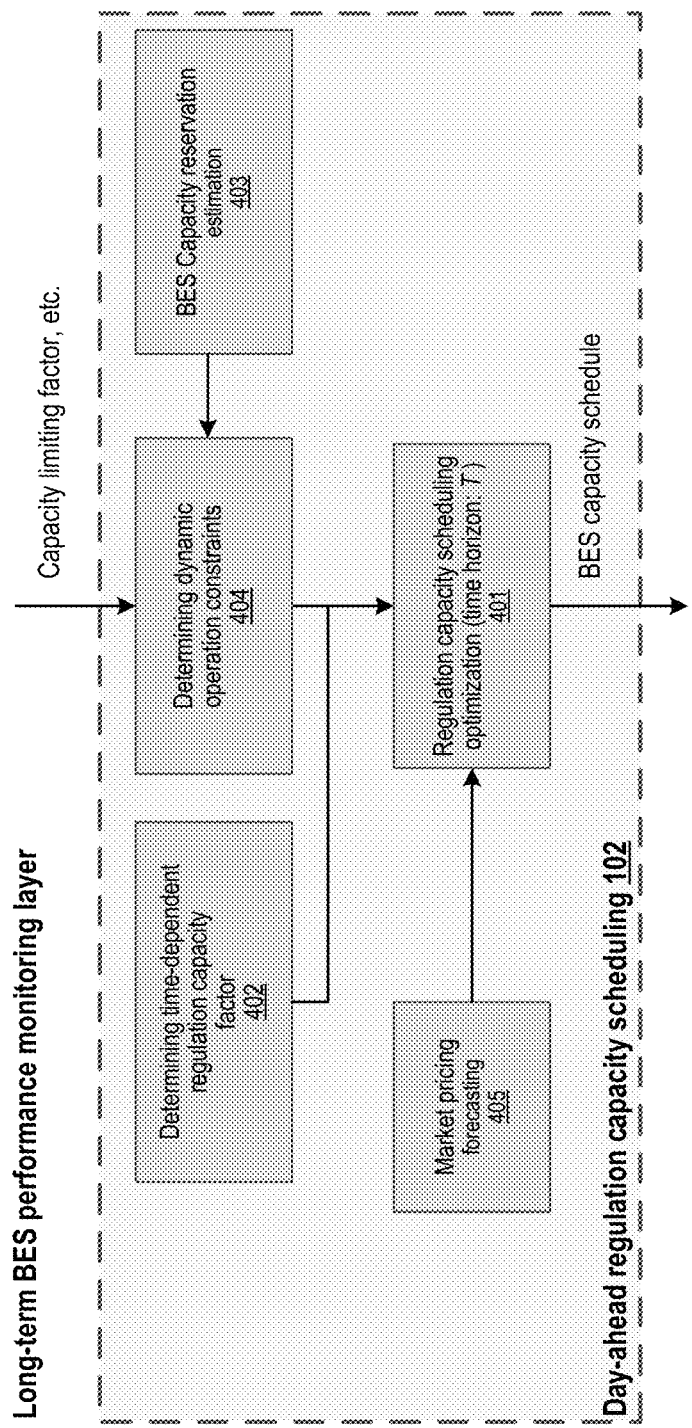
FIG. 4 illustrates a control flow diagram of day-ahead regulation capacity scheduling, in accordance with an example implementation.

FIG. 4 illustrates a control flow diagram of day-ahead regulation capacity scheduling, in accordance with an example implementation. Typically, the regulation capacity scheduling is settled with hourly time resolution. The time resolution can also be flexibly adjusted based on different market operation rules in different ISO/TSO market.

In most cases, the day-ahead regulation capacity scheduling runs based on schedules. The most common operation rate is daily, which may vary according to different market rules. In some cases, the optimal regulation capacity scheduling can also re-run more than once during one day on demand or triggered by events.

Regulation capacity scheduling optimization 401: For day-ahead regulation capacity scheduling, the optimization objective is to maximize the daily revenue through regulation market participation. An example regulation capacity scheduling optimization is formulated based on PJM regulation market rules. The regulation revenue maximization is formulated as a linear programming problem. The optimization formulation can be modified based on different specific rules in different ISOs/TSOs.

Table 1 shows the parameter list used in the present disclosure, wherein t represents an integer for a discrete-time process.

TABLE 1

Parameter list (Take PJM regulation market as example)

| Parameter | Notes |
|---|---|
| RMPCP(t) | Regulation market performance clearing price ($/MWh) during time interval t |
| RMCCP(t) | Regulation market capacity clearing price ($/MWh) during time interval t |
| $r_{RD}(t)$ | Regulation down capacity factor during time interval t |
| $r_{RU}(t)$ | Regulation up capacity factor during time interval t |
| $\mu(t)$ | Regulation performance score during time interval t |
| $\beta_M(t)$ | Mileage ratio during time interval t |
| $q_{RM}$ | Maximum allowable energy capacity commitment during time interval t |
| $SoC_{max}$ | Maximum energy storage operation capacity, defined in energy measurement unit, e.g. kWh |

TABLE 1-continued

Parameter list (Take PJM regulation market as example)

| Parameter | Notes |
|---|---|
| $SoC_{min}$ | Minimum energy storage operation capacity, defined in energy measurement unit, e.g. kWh |
| $\tau$ | Time interval |
| $q(t)$ | The awarded regulation capacity during time interval t |

The performance-based regulation compensation in PJM regulation market during time interval t is formulated as:

$$f(t)=q(t)\mu(t)\{\beta_M(t)\text{RMPCP}(t)+\text{RMCCP}(t)\} \qquad \text{Eq. 2}$$

For the day-ahead battery regulation capacity scheduling, the optimization objective is to maximize the daily revenue when the storage unit participates in the regulation market:

$$\max \Sigma_{t=1}^{T} f(t) = \Sigma_{i=1}^{T} q(t)\mu(t)\{\beta_M(t)\text{RMPCP}(t)+\text{RMCCP}(t)\} \qquad \text{Eq. 3}$$

Where T is the optimization horizon, e.g. 24 hours. The time resolution is considered as hourly. The RMPCP(t) and RMCCP(t) are hourly market price information. $\mu(t)$ is the hourly integrated regulation performance score. The optimization constraints are formulated based on battery storage system modelling.

The following is in regard to Energy Capacity commitment constraints:

$$q(t) \leq \overline{q_{RM}} \qquad \text{Eq. 4}$$

The maximum allowable capacity that can be dispatched during each time interval $\tau$ (e.g. one hour) are defined as:

$$\overline{q_{RM}}=\min(\overline{P_{ch}}\times\Sigma,\overline{P_{dis}}\times\tau) \qquad \text{Eq. 5}$$

Where $\overline{P_{ch}}$ represents maximum charging power, $\overline{P_{dis}}$ represents maximum discharging power.

The following is in regard to the SoC operation limit, here the SoC(t) is measured in energy unit, e.g. kWh $$SoC_{min} \leq SoC(t) \leq SoC_{max} \qquad \text{Eq. 6}$$

The SoC at time t is modelled as:

$$SoC(t)=SoC(t-1)+\gamma_c r_{RD}(t)q(t)-r_{RU}(t)q(t) \qquad \text{Eq. 7}$$

where $\gamma_c$ is the storage conversion efficiency, $r_{RD}(t)$, $r_{RU}$ is the regulation down and regulation up capacity factor. The regulation down/up capacity factor ($r_{RD}(t)$, $r_{RU}(t)$) represents the average fraction of the reserved capacity being dispatched for regulation up or regulation down separately during each operation interval.

Determining time-dependent regulation capacity factor 402: The frequency regulation service includes two types: regulation up and regulation down, which require BES power discharging and charging separately. During real-time regulation dispatching, the regulation resource follows the FR signal sent by market operators. The maximum power being dispatched is bounded by the awarded regulation capacity (q(t)).

Figure 5:
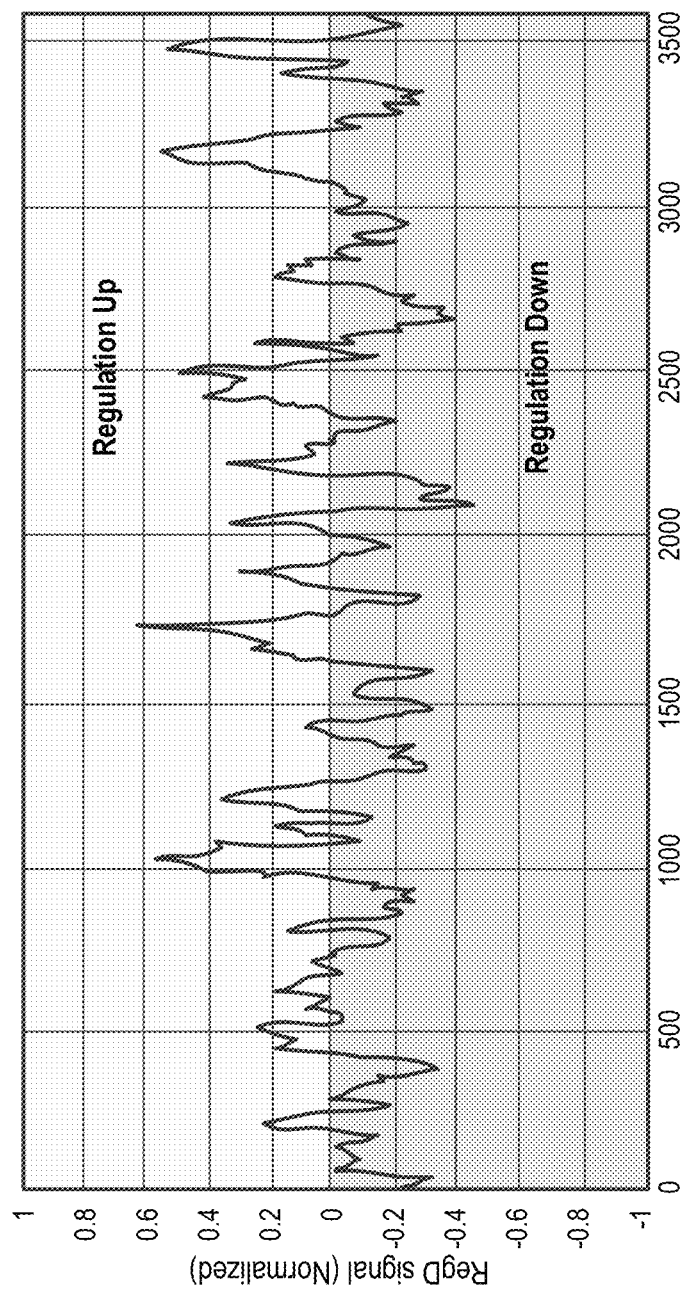
FIG. 5 illustrates an example sample of a PJM RegD signal, in accordance with an example implementation.

FIG. 5 illustrates an example sample of a PJM RegD signal, in accordance with an example implementation. Specifically, FIG. 5 is sampled over a two hour time span with a two second time resolution. Usually only a portion of the reserved capacity will be actually deployed during each time interval as illustrated in FIG. 5. The regulation capacity factor will be defined separately as: regulation up capacity factor $r_{RU}(t)$ and regulation down capacity factor $r_{RD}(t)$.

The regulation down/up capacity factor ($r_{RD}(t)$, $r_{RU}(t)$) represents the average fraction of the reserved capacity being dispatched for regulation up or regulation down separately during each operation interval $\tau$. The capacity factor during each operation interval $\tau$ is calculated as:

$$r_{RU}(t) = \frac{P_{RU}(t)}{q_{RU}(t)} \qquad \text{Eq. 8}$$

$$r_{RD}(t) = \frac{P_{RD}(t)}{q_{RD}(t)} \qquad \text{Eq. 9}$$

$$r_{RU}(t) = avg\left(\frac{P_{RU}(t)}{q_{RU}(t)}\right); r_{RD}(t) = avg\left(\frac{P_{RD}(t)}{q_{RD}(t)}\right) \qquad \text{Eq. 10}$$

$P_{RU}(t)$, $P_{RD}(t)$ are the high-frequency regulation up/down dispatching signal sent by market operators, $q_{RU}(t)$, $q_{RD}(t)$ are awarded regulation up/down capacity for this regulation resource. In PJM, $q_{RU}$ is equal to $q_{RD}$. While for CAISO, regulation up and down market are settled and dispatched separately. However, at each time instant, only one of these two signals is typically valid.

The time-dependent regulation capacity factor is used to address the FR signal uncertainties statistically over certain time interval. Considering the high time resolution (e.g., two to four seconds) and the randomness of frequency regulation signal, instead of forecasting the FR signal using complicated time-series models which will requires high computational resources, example implementations capture the statistical features at a reduced time resolution, which is more effective than the related art time-series models.

Figure 6:
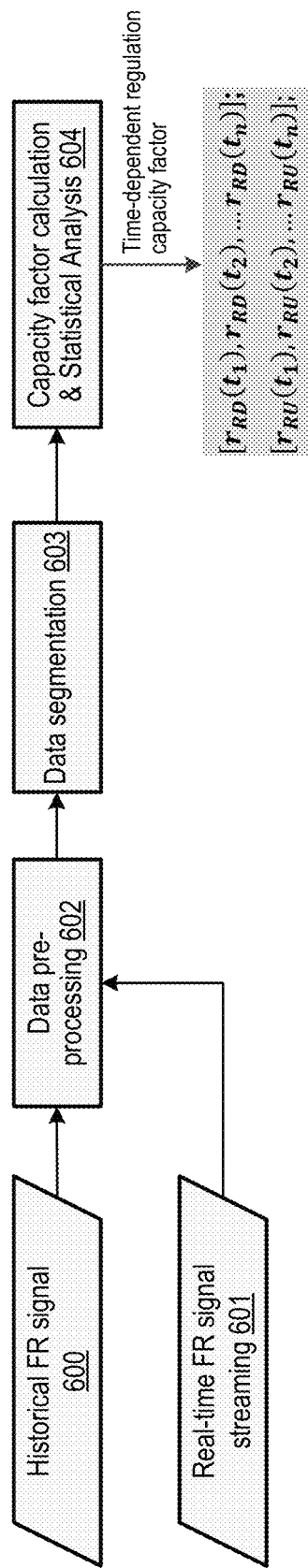
FIG. 6 illustrates an example of the FR signal analysis framework for the regulation capacity factor, in accordance with an example implementation.

FIG. 6 illustrates an example of the FR signal analysis framework for the regulation capacity factor, in accordance with an example implementation. The data analysis framework described in FIG. 6 is used for the feature extraction from the time-series FR dispatching signal. The analysis output will be updated at a fixed time interval with a new FR signal streaming in. The time-series FR dispatching signals are partitioned into different segments based on seasons, day of week, and time of day, and so on depending on the desired implementation. In an example implementation, historical FR signal 600 and real-time FR signal steaming 601 are sent to data pre-processing 602 wherein data segmentation 603 is conducted. At 604, the capacity factor calculation and statistical analysis is conducted to provide a time-dependent regulation capacity factor.

Figure 7:
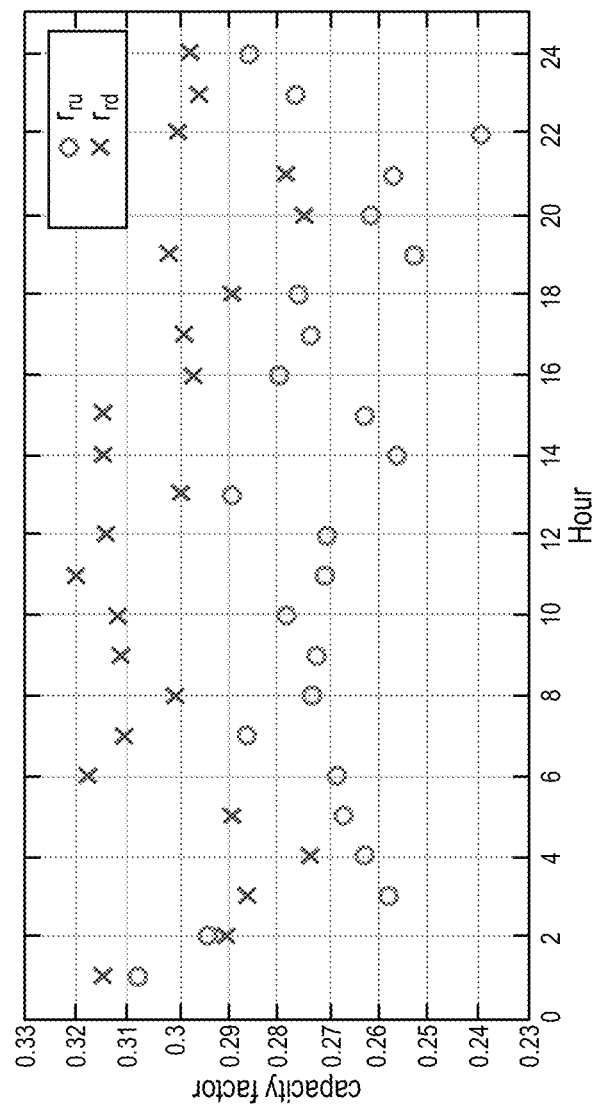
FIG. 7 illustrates an example median hourly regulation up/regulation down capacity factor based on the example set of the PJM regulation signal, in accordance with an example implementation.

FIG. 7 illustrates an example median hourly regulation up/regulation down capacity factor based on the example set of the PJM regulation signal, in accordance with an example implementation. The time resolution of extracted temporal features (($r_{RD}(t)$, $r_{RU}(t)$)) can be adjusted using the actual day-ahead market capacity bidding interval. For example, if the capacity bidding interval is 15 minutes, the features can be extracted at 15-min intervals.

BES Capacity reservation estimation (403): When there are additional capacity requests from grid operators or system operators (e.g. peak shaving capacity reservation requirement during certain time period), the dynamic capacity reservation request will be formulated into operation constraints (e.g. Eq.4, Eq.5) for optimal BES regulation capacity scheduling.

Determining dynamic operation constraints (404): This BES capacity limiting factor ($\mu(t)$) is generated from long-term BES performance planning layer, which reflects the long-term impacts of short-term BES scheduling and real-time operation on battery degradation. This limiting factor will affect the operation constraints as described in Eq. 4-6. The constraints will be dynamically updated along with $\mu(t)$ updating. An example constraint update is described as $$SoC_{max}(t)=\mu(t)\times SoC_{max,0} \qquad \text{Eq. 11}$$

Real-Time Battery Operation Control Layer (103)

The real-time battery operation control layer is to decide the actual battery charging or discharging power after receiving the regulation dispatching signal from market operators. The real-time operation control target maintains a high-regulation performance score, while reducing SoC limit violations and sustaining the battery life span. The real-time operation control layer is designed to operate at a high rate, following the high frequency regulating signal.

Figure 8:
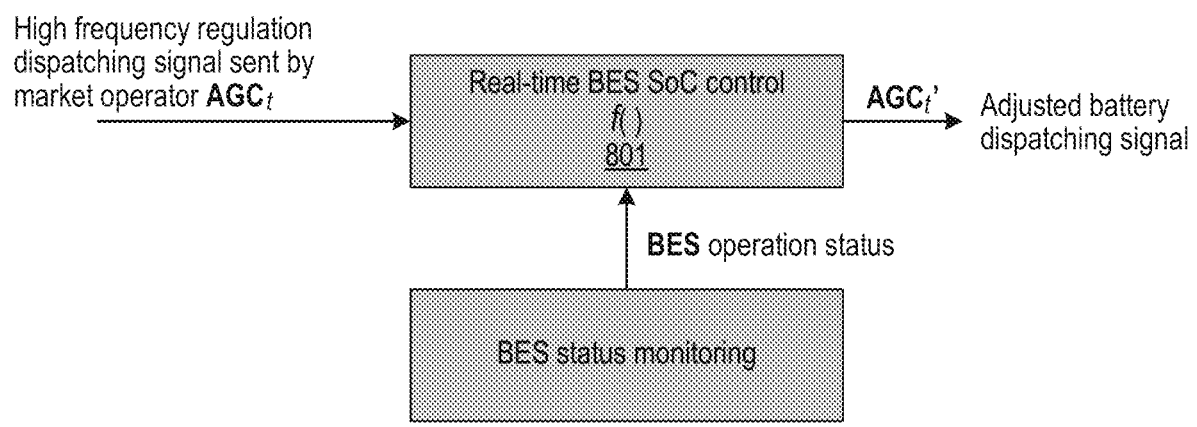
FIG. 8 illustrates a flow diagram of real-time BES operation control, in accordance with an example implementation.

FIG. 8 illustrates a flow diagram of real-time BES operation control, in accordance with an example implementation. The real-time battery operation control layer 103 executes the process illustrated in FIG. 8. The BES operation status and market operation data will be continuously monitored, and then the real-time SoC control policy will be adjusted dynamically based on such online observations.

Figure 9:
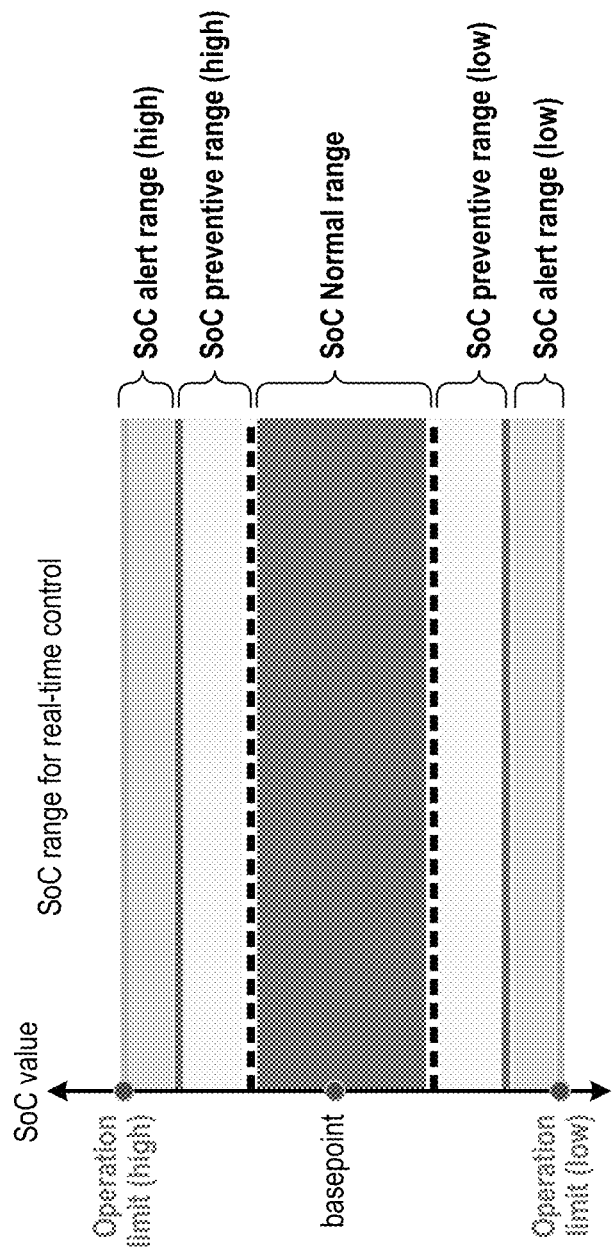
FIG. 9 illustrates a division of SoC level for real-time BES control, in accordance with an example implementation.
Figure 10:
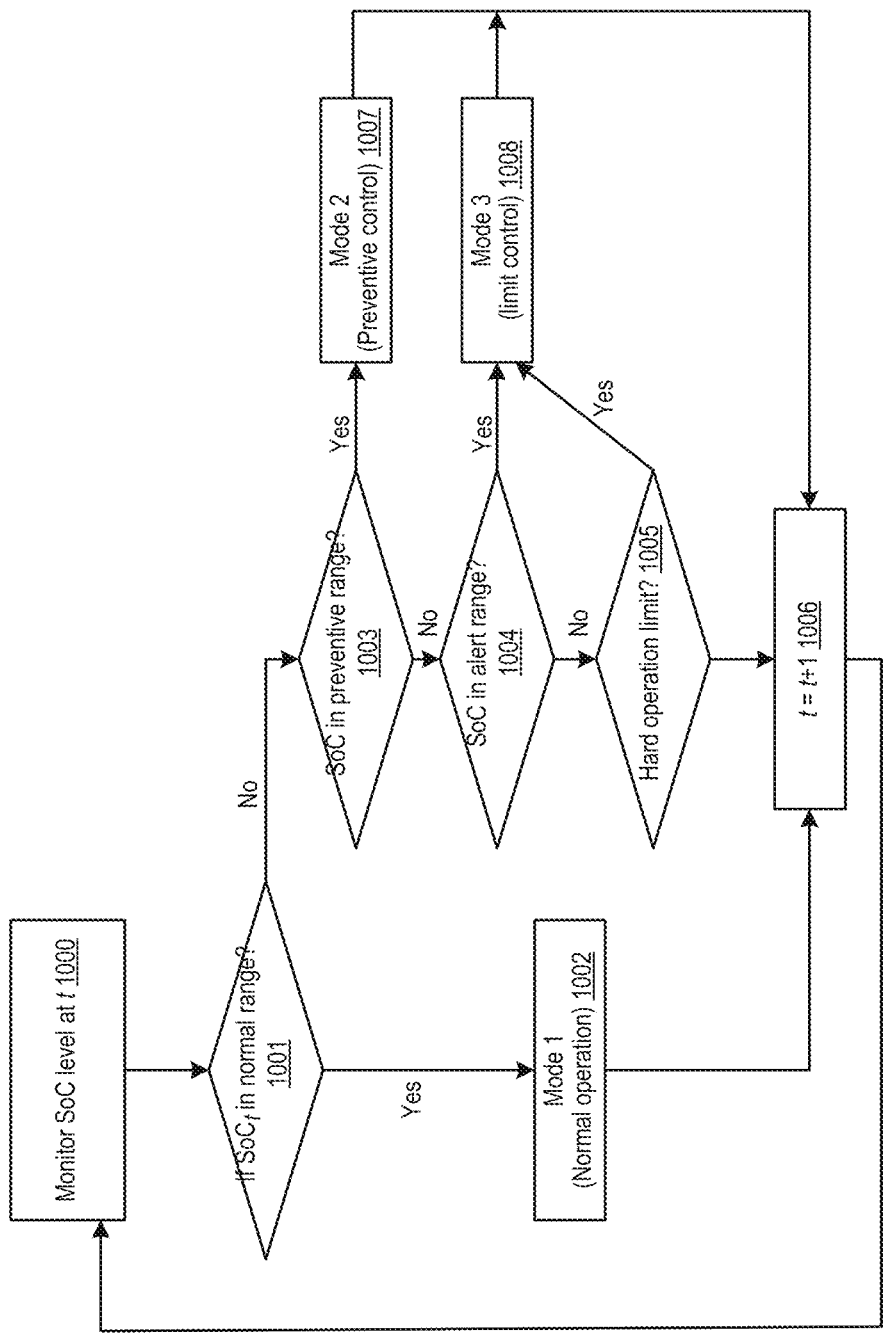
FIG. 10 illustrates an example flow diagram of real-time BES SoC control, in accordance with an example implementation.

Real-time BES SoC control (801): The objective of the real-time SoC control module is to help sustain BES SoC level within allowable range through regulation power adjustment, meanwhile make sure the deviation from requested regulation signal is constrained with certain range and a relatively high performance score is guaranteed. FIG. 10 illustrates an example flowchart of BES real-time SoC control, in accordance with an example implementation. The BES real-time SoC control is implemented through control mode switching. Each control mode is activated based on the current SoC status of BES. In each mode, different control strategies are carefully designed to regulate the BES energy level and maintain frequency regulation performance, as described in Table 2. The details of each control strategies are described below. The division of BES SoC level is illustrated in FIG. 9.

TABLE 2

BES real-time control operation mode

| Mode | SoC level | Control Strategies |
|------|-----------|--------------------|
| 1 | In normal range ($SoC_{normal}$) | Normal operation |
| 2 | Preventive range ($SoC_{prev,high}$ or $SoC_{prev,lower}$) | Preventive control |
| 3 | Alert range ($SoC_{alert,high}$ or $SoC_{alert,low}$) | limit control |
| 4 | Out of hard operation limit (>$SoC_{limit,high}$ or <$SoC_{limit,low}$) | Limit control |

FIG. 9 illustrates a division of SoC level for real-time BES control, in accordance with an example implementation. As illustrated in FIG. 9, there is a SoC normal range that is set based on a normal operating base point, and alert range based on the operation limit of the energy control system. In order to have some leeway to prevent the SoC level from reaching the limits of the energy control system, preventative ranges are utilized to prevent the SoC level from reaching the operation limits.

FIG. 10 illustrates an example flow diagram of real-time BES SoC control 801, in accordance with an example implementation. At 1000, the SoC level is monitored for a time t. At 1001, a determination is made as to whether the SoC level at time t is in the normal range. If so (Yes) then the flow proceeds to 1002 to conduct the normal operation. Otherwise (No), the flow proceeds to determine if the SoC level is in the preventative range at 1003. If so, (Yes), then the flow proceeds to 1007 to conduct preventive control, otherwise (No), a determination is made as to whether the SoC is in the alert range at 1004. If so (Yes), then the flow proceeds to 1008 to conduct limit control, otherwise (No), the flow proceeds to 1005 to determine if the SoC level has reached a hard operation limit. If so (Yes), then the flow proceeds to 1008 to conduct limit control, otherwise (No), the flow proceeds to 1006 to increment the time and then to 1000 to monitor the SoC level at the new time increment. Further details of each operation mode are as follows.

Mode 1: Normal Operation 1002

When the SoC level $SoC_t$ is in the normal range or comfort range, there is enough energy capacity left for BES to closely follow frequency regulation signal without violating SoC constraints. In this mode, the BES will directly follow regulation signals sent by market operators. So the function f( ) simply passes the AGC signal through. The regulation power adjustment is only brought into picture when the energy status of BES is out of normal range.

$$f(AGC_t)=AGC_t \quad \text{Eq. 12}$$

Mode 2: Preventive Operation Control 1007

Figure 11:
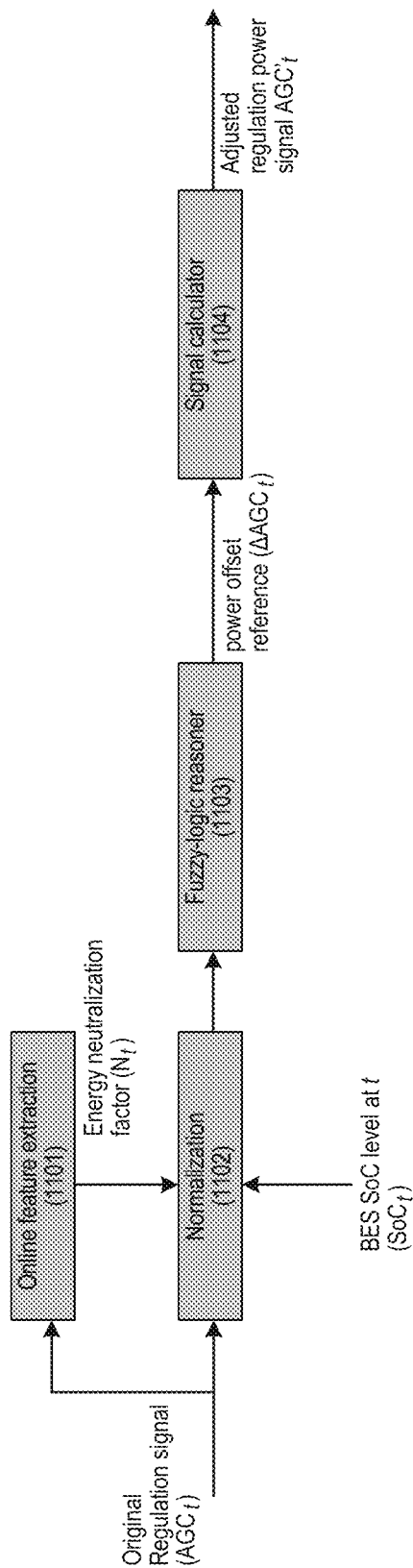
FIG. 11 illustrates an example control diagram utilizing fuzzy-logic control for regulation power adjustment, in accordance with an example implementation.

When the SoC level is in the preventive range, the regulation signal is dynamically adjusted in real-time to help prevent the SoC level further deviating from normal range along with BES continuous operation. FIG. 11 illustrates an example control diagram utilizing fuzzy-logic control for regulation power adjustment, in accordance with an example implementation. The control variables are provided to the fuzzy-logic control system with a pre-designed rule base and membership functions. The regulation power adjustment references are output to offset the original requested regulating power sent by market operators.

As shown in FIG. 11, the original regulation dispatching signal ($AGC_t$), the BES SoC status ($SoC_t$) and the feature extracted from time-series regulation signal ($N_t$) are the inputs to a fuzzy-logic reasoner. The deviation from the requested regulation power signal is the output. The control signal calculator generates the final BES power reference signal which will be sent to BMS (Battery Management System) for direct BES power dispatching. In the control signal calculator, the BES operation limitation, e.g. the maximum charging/discharging power, the maximum rate of change, and so on, will be checked to guarantee the safe operation.

The fuzzy logic-based control system does not require precise mathematical modeling, and it also does not require high computation resources. The main part of fuzzy-logic controller includes input/output variable membership functions and reasoning rules, which can be developed and continuously refined based on expert knowledges, simulations and experiments.

Online feature extraction (1101): The high frequency regulating signal usually is very random, and difficult to predict through time-series models. Some temporal features are continuously extracted as inputs for real-time BES operation control. The energy neutralization of regulation signal over certain time interval T will help energy-limited storage resources keep the balance between charging and discharging energy flow through them. The energy neutrality factor ($N_t$) is calculated as the integration of the regulation dispatching power within certain time period of T, as in Eq. (13). It is measured in energy unit, e.g. kWh.

$$N_t = \sum_{i=1}^{K} \tau P_{t,i} \quad \text{Eq. 13}$$

Where $P_{t,i}$ is the i-th regulation dispatching signal within the t-th time window. The time resolution is $\tau$. K represents the total number of data points within time period of T. The closer the value of $N_t$ is to zero, the better energy neutral the regulation signal is. It is assumed that the negative value of $P_{t,i}$ means power withdrawal from grid, positive value means power injection from BES to grid. So the negative value of $N_t$ means that there are more charging energy flowing through which will bring BES SoC up at the end of each time interval T, the positive value means more discharging energy flowing through the BES to decrease the SoC level.

Figure 12A:
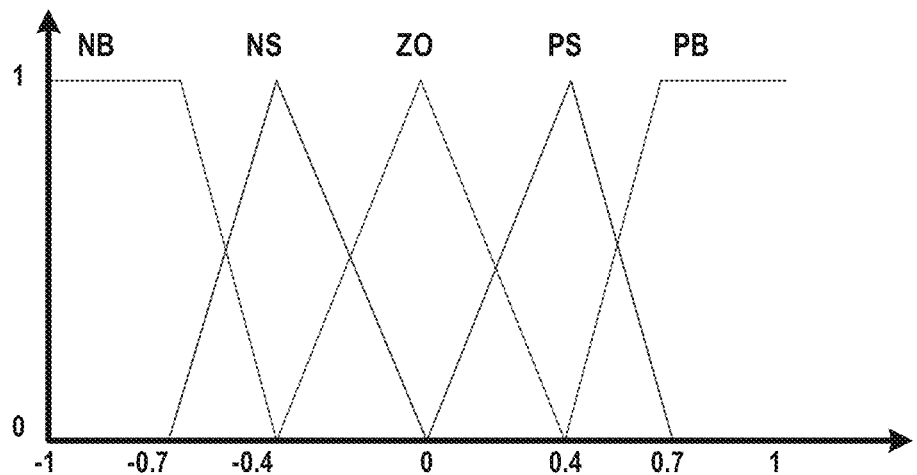
FIGS. 12(a) to 12(c) illustrate example membership functions of input variables, in accordance with an example implementation.
Figure 12B:
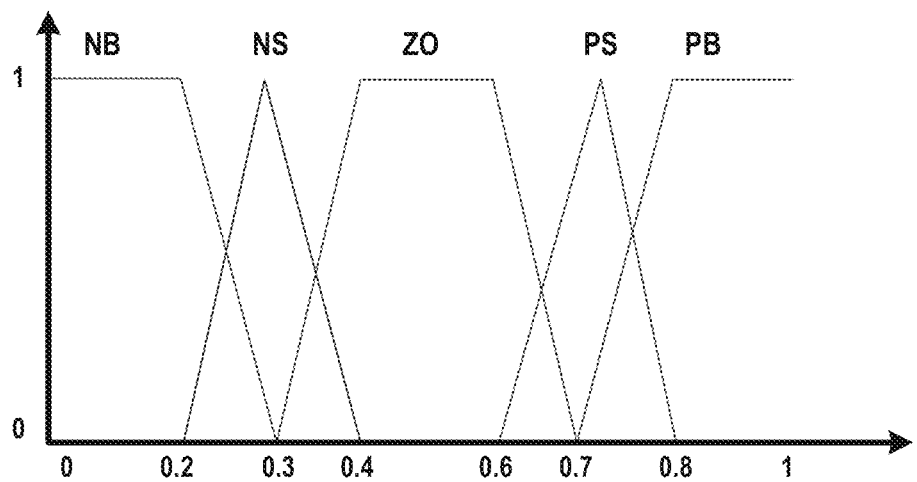
Figure 12C:
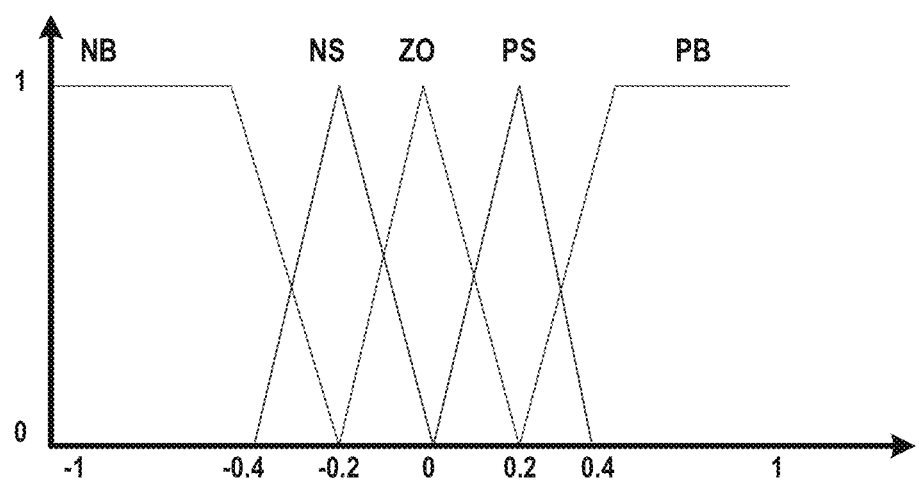
Figure 13:
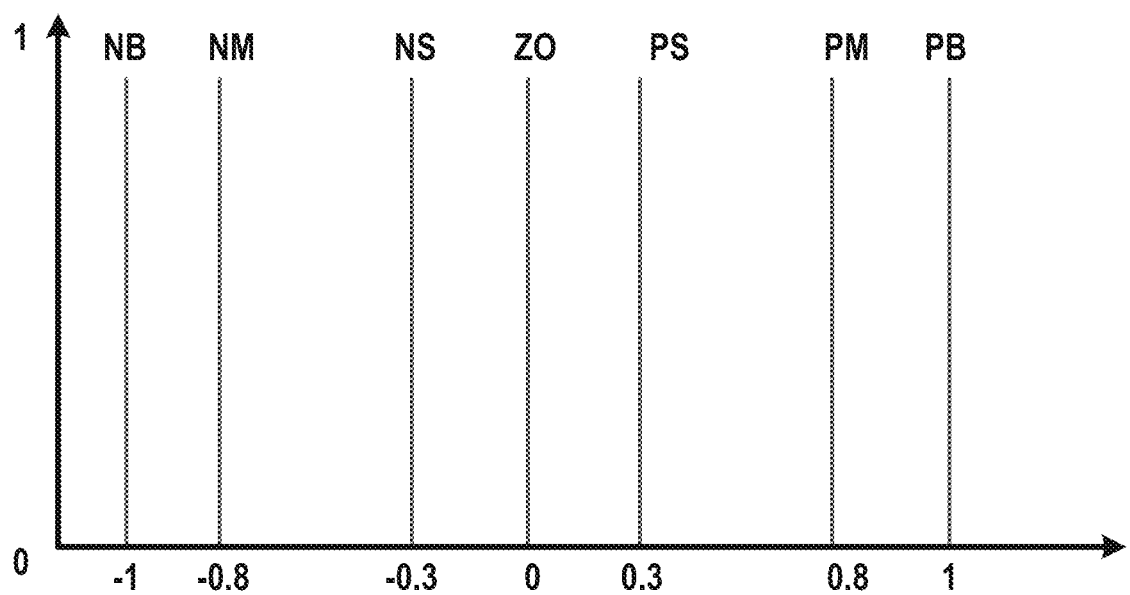
FIG. 13 illustrates an example membership function of output variables, in accordance with an example implementation.
Figures 17A, 17B:
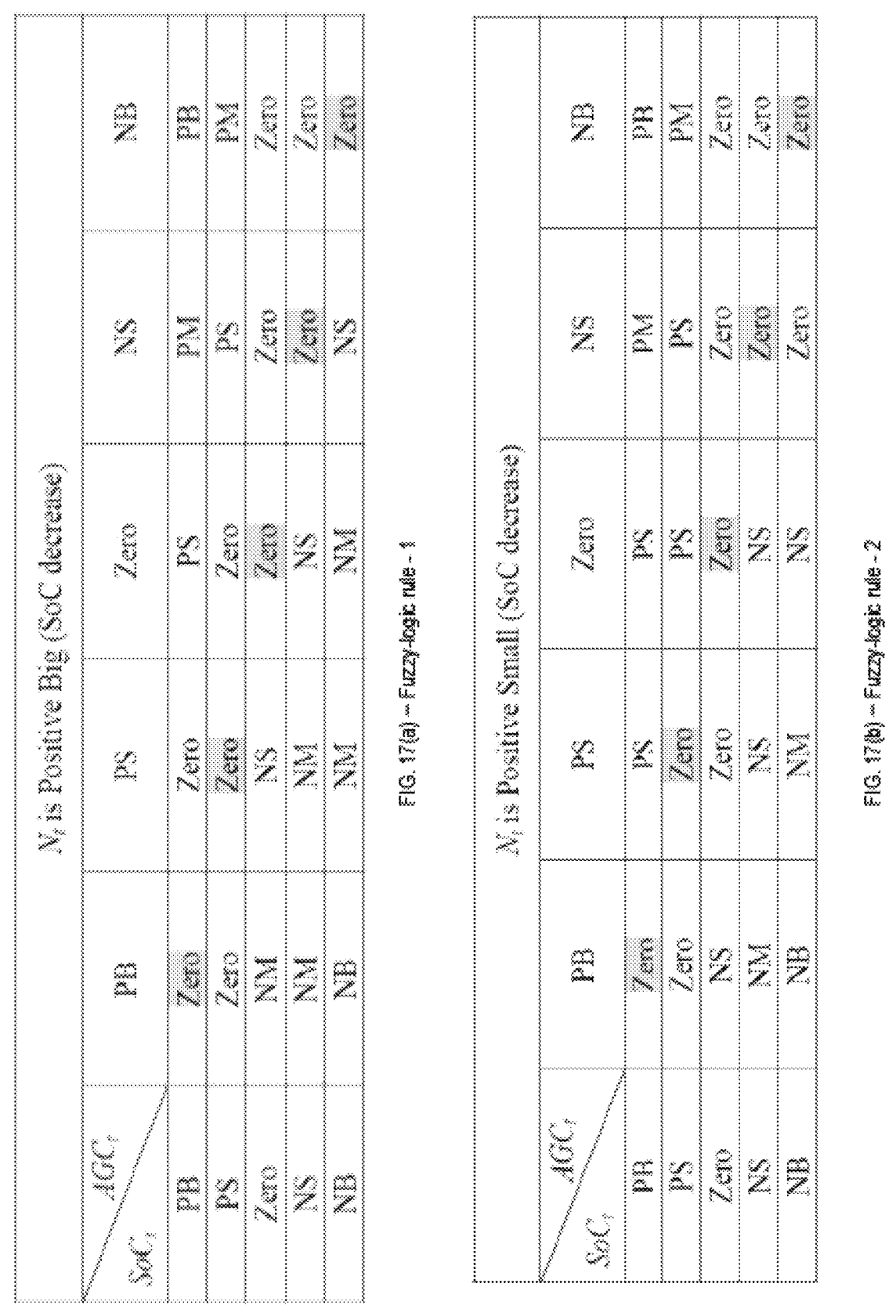

Normalization (1102): The fuzzy variables of input and output are expressed by linguistic variables: "positive big (PB)", "Positive medium (PM)", "Positive small (PS)", "Zero(ZO)", "Negative big (NB)", "Negative small (NS)", "Negative medium (NM)". An exemplary membership function of each fuzzy input/output variables are illustrated in FIG. 12 and FIG. 13. All the input/output variables are normalized between −1 and 1 or between 0 and 1. The normalization block is described with respect to the fuzzy logic reasoner 1103. An example set of the "if-then" fuzzy rules are listed in FIG. 17(*a*) to FIG. 17(*e*).

FIGS. 12(*a*) to 12(*c*) illustrate example membership functions of input variables, in accordance with an example implementation.

Specifically, FIG. 12(*a*) illustrate an example membership function for when the input variable is $AGC_t$, FIG. 12(*b*) illustrates an example membership function for when the input variable is BES SoC, and FIG. 12(*c*) illustrates an example membership function for when the input variable is Energy Neutralization factor ($N_t$). FIG. 13 illustrates an example membership function of output variables, in accordance with an example implementation.

The rules are designed to adjust the regulation power in the direction that bring the SoC level of BES back to the normal range. The power adjustment level is affected by the current BES SoC level, the requested regulation power value, and the trend of energy neutralization factor during the current time period. For example, the closer the SoC level of BES approaches the lower boundary, the higher the requested regulation-up power becomes, wherein the higher power adjustment will be added on to the requested regulation power which will help prevent the SoC from further shifting towards the lower boundary.

The fuzzy-logic controller operates at high frequency same as regulation signal (e.g. two to four seconds) The three input variables are updated at different rates. The BES SoC level $SoC_t$ and the regulation signal $AGC_t$ is refreshed at high frequency. The Energy Neutralization factor ($N_t$) is updated at a lower frequency, for which a common temporal segmentation method, the sliding window approach with a fixed time window size (T), is used. The fixed time window size T can be flexible adjusted.

Fuzzy logic reasoner (1103): The input variables for the fuzzy-logic control system needs to be normalized before feeding into the controller. For the regulation signal $AGC_t$, an exemplary normalization reference can be set as the awarded regulation capacity at that time instant. For the energy neutralization factor ($N_t$), the normalization reference can be set as the span of preventive zone. For energy status level ($SoC_t$), the normalization can be formulated as Eq.14.

$$\text{Normalization}(SoC_t) = \begin{cases} \frac{SoC_{low,1} - SoC_t}{2\Delta SoC_{prev,low}} + 0.5 & \text{if } SoC_t \text{ in lower preventive range} \\ \frac{SoC_t - SoC_{high,1}}{2\Delta SoC_{prev,high}} + 0.5 & \text{if } SoC_t \text{ in higher preventive range} \end{cases} \quad \text{Eq. 14}$$

$\Delta SoC_{prev,low}$, $\Delta SoC_{prev,high}$ presents the span of low and high SoC preventive zone. $SoC_{low,1}$ is the higher boundary of the low preventive zone. $SoC_{high,1}$ is the lower boundary of the high preventive zone.

Figure 14:
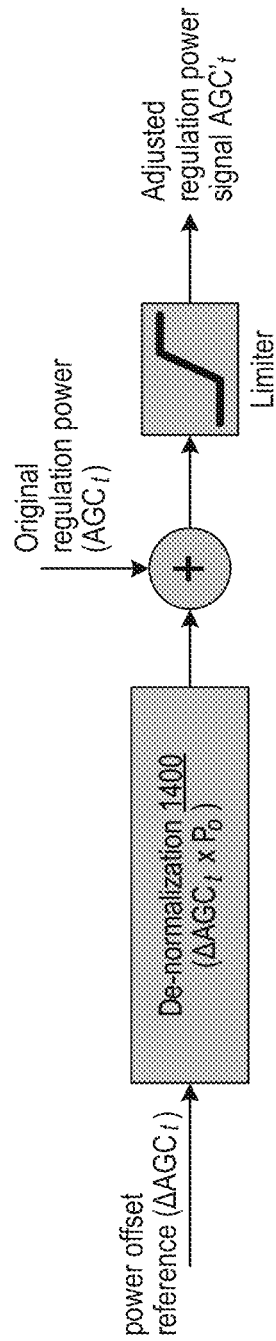
FIG. 14 illustrates the flow diagram of the control signal calculator, in accordance with an example implementation.

Control Signal calculator (1104): FIG. 14 illustrates the flow diagram of the control signal calculator, in accordance with an example implementation. As illustrated in FIG. 14, The output of the fuzzy-logic control system needs to be de-normalized 1400 as the deviation from the requested regulation power, and then added back to original regulation power signal. The BES operation limitation, e.g. the maximum charging/discharging power, the maximum rate of change, and so on, will be checked to guarantee the safe operation. The reference power value ($P_o$) used in output de-normalization can be as the rated BES power, or only percentage of the rated BES power. The selection of $P_o$ can be based on expert knowledge, trial and error approaches, or through offline model training.

Mode 3: Limit Control

When BES real-time control is in this mode, a rule-based approach is applied to constrain the BES dispatching power, wherein the storage will stop following the AGC signal unless the regulation dispatching power is in the right direction to bring SoC back to normal range, as described in Eq. (15).

$$f(AGC_t) = \begin{cases} AGC_t & \text{if } AGC_t < 0 \text{ when } SoC_t \text{ in } SoC_{alert,low} \\ AGC_t & \text{if } AGC_t > 0 \text{ when } SoC_t \text{ in } SoC_{alert,high} \\ AGC_t & \text{others} \end{cases} \quad \text{Eq. 15}$$

Through the example implementations described herein, the multi-time scale BES management framework can be used for scheduling and operating the BES in a performance-based regulation market. This multi-time scale BES management framework covers the long-term battery performance planning layer, the day-ahead regulation capacity scheduling layer, and the real-time battery operation control layer. The targeted potential user can be battery owners, system aggregators, utilities, and so on.

Figure 15:
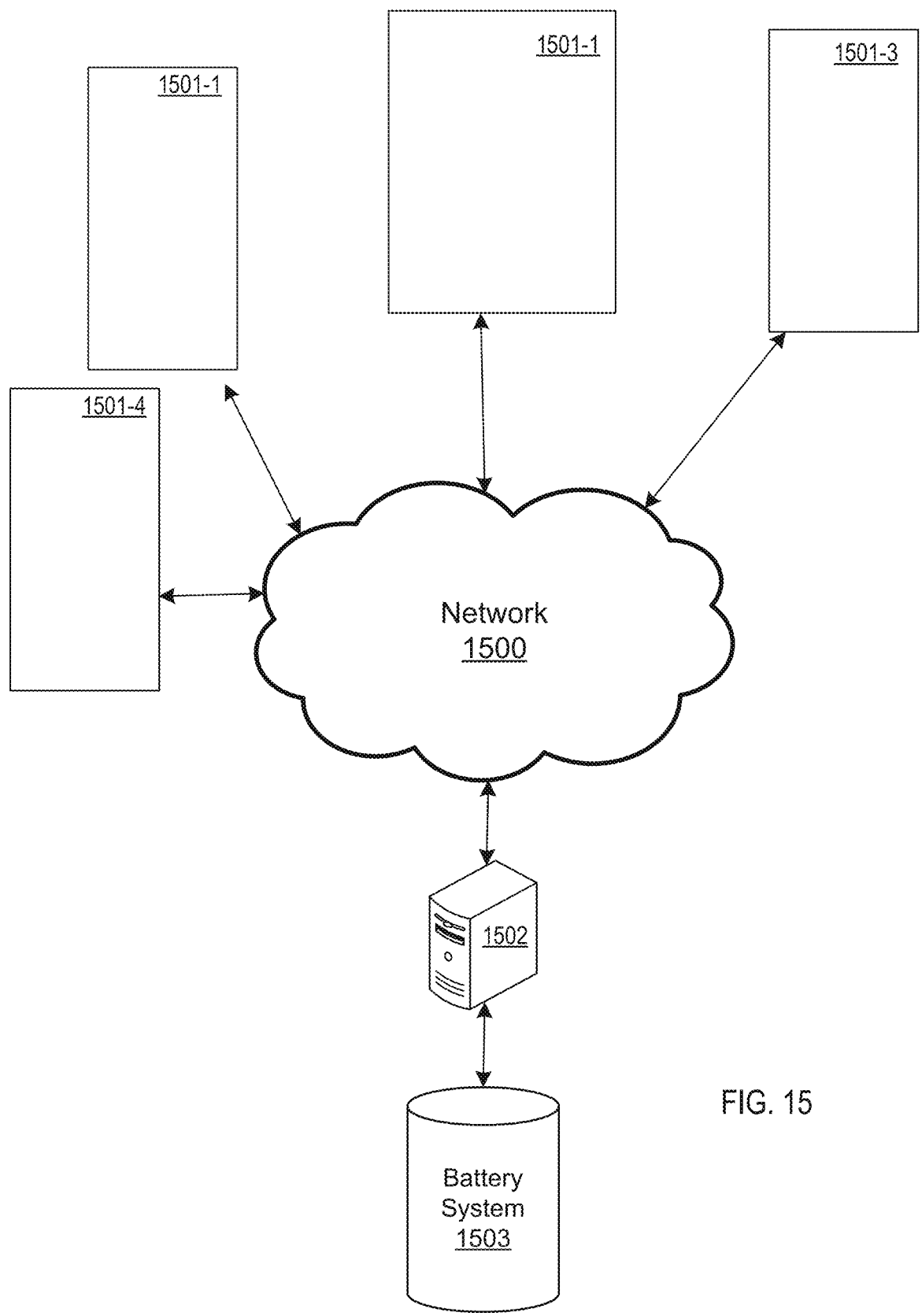
FIG. 15 illustrates a system to control a battery system including battery system management apparatus, in accordance with an example implementation.

FIG. 15 illustrates a system to control a battery system including battery system management apparatus, in accordance with an example implementation. One or more operators 1501-1, 1501-2, 1501-3, and 1501-4 are communicatively coupled to a network 1500 which is connected to a battery system management apparatus 1502. The battery management apparatus 1502 manages a battery system 1503, which supplies power to the one or more operators 1501-1, 1501-2, 1501-3, and 1501-4. Depending on the desired implementation, battery management apparatus 1502 may also obtain market conditions as described with respect to Table 1 through the network 1500 from market entities in accordance with the desired implementation. Battery system management apparatus 1502 can dispatch battery dispatching signals to the battery system 1503 control the power of the battery system as provided to the operators 1501-1, 1501-2, 1501-3, 1501-4.

Figure 16:
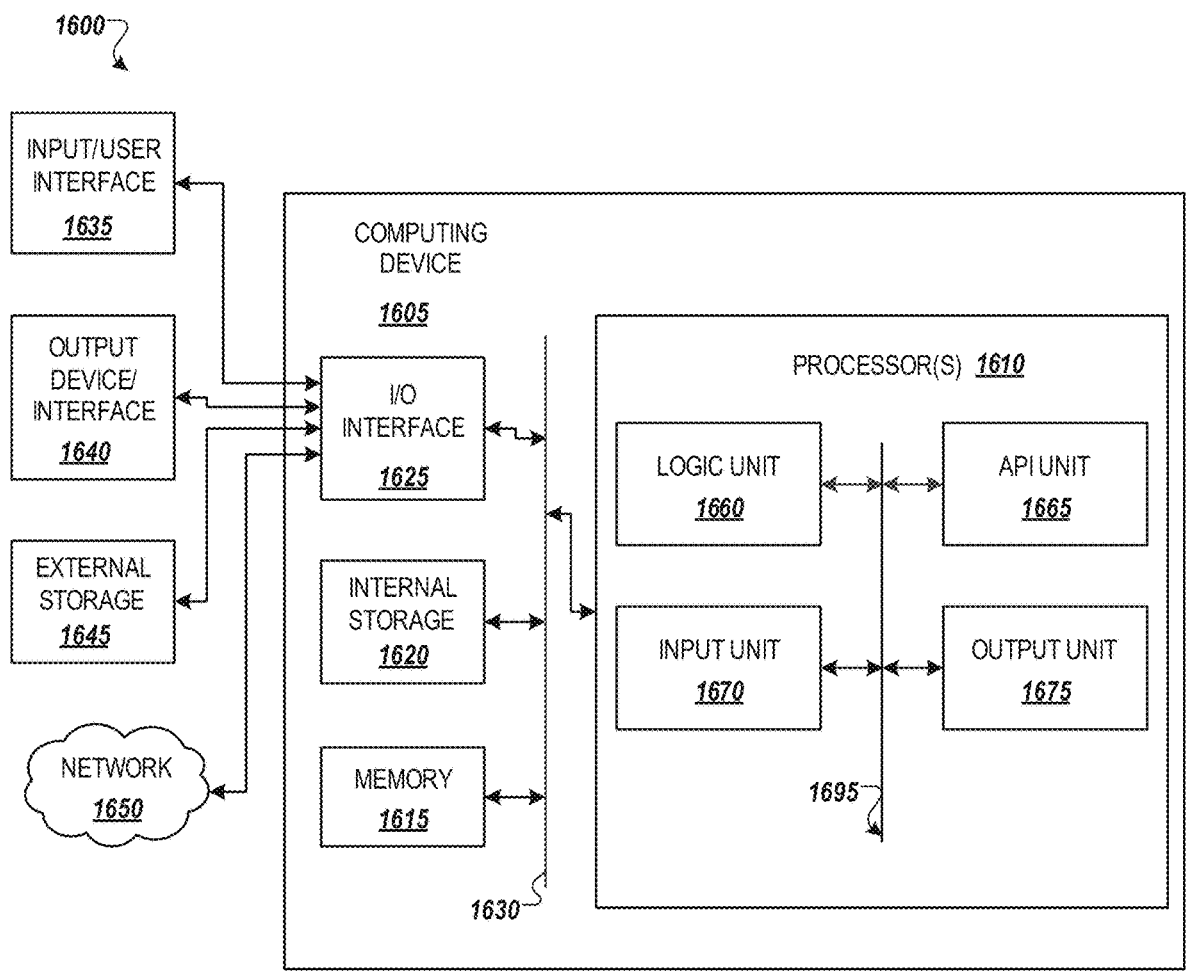
FIG. 16 illustrates an example computing environment with an example computer device suitable for use in some example implementations.

FIG. 16 illustrates an example computing environment with an example computer device suitable for use in some example implementations, such as a battery management apparatus 1502 as illustrated in FIG. 15. Computer device 1605 in computing environment 1600 can include one or more processing units, cores, or processors 1610, memory 1615 (e.g., RAM, ROM, and/or the like), internal storage 1620 (e.g., magnetic, optical, solid state storage, and/or organic), and/or I/O interface 1625, any of which can be coupled on a communication mechanism or bus 1630 for communicating information or embedded in the computer device 1605. I/O interface 1625 is also configured to receive images from cameras or provide images to projectors or displays, depending on the desired implementation.

Computer device 1605 can be communicatively coupled to input/user interface 1635 and output device/interface 1640. Either one or both of input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1640 may include a display, television, monitor, printer, speaker, braille, or the like. In some example implementations, input/user interface 1635 and output device/interface 1640 can be embedded with or physically coupled to the computer device 1605. In other example implementations, other computer devices may function as or provide the functions of input/user interface 1635 and output device/interface 1640 for a computer device 1605.

Examples of computer device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1605 can be communicatively coupled (e.g., via I/O interface 1625) to external storage 1645 and network 1650 for communicating with any number of networked components, devices, and systems, including one or more computer devices of the same or different configuration. Computer device 1605 or any connected computer device can be functioning as, providing services of, or referred to as a server, client, thin server, general machine, special-purpose machine, or another label.

I/O interface 1625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computer device 1605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided. Processor(s) 1610 can be in the form of hardware processors such as central processing units (CPUs) or in a combination of hardware and software units.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, input unit 1670, output unit 1675, in some example implementations described above. For example, the flow of one or more processes or implementations may be controlled by logic unit 1660 alone or in conjunction with API unit 1665. The input unit 1670 may be configured to obtain input for the calculations described in the example implementations, and the output unit 1675 may be configured to provide output based on the calculations described in example implementations.

Memory 1615 can be configured to store management information such as that shown in Tables 1-7, as well as a schedule for operating the battery system.

Processor(s) 1610 can be configured to manage a battery system, wherein the processor(s) 1610 can be configured to execute a first process periodically to determine an effective capacity of the battery system as illustrated in FIG. 2; execute a second process configured to provide a schedule of usage of the battery system to one or more operators based on the effective capacity, market conditions, and operation constraints as illustrated in FIG. 4; and execute a third process in real time configured to control the battery system according to the schedule, battery status in real time, and signals provided from the one or more operators as illustrated in FIG. 8.

For example, the first process can involve for a predetermined time interval being reached 204 or for an abnormality being detected from one or more of estimated life cycles of the battery system and status of the battery system 202, processor(s) 1610 is configured to determine the effective capacity of the battery system based on the estimated life cycles of the battery system and a rated battery life cycle of the battery system as illustrated at 203 of FIG. 2.

In another example implementation, the second process can involve determining the operation constraints based on the effective capacity and capacity reservation estimation as illustrated at 402, 403, 404 of FIG. 4; obtaining the market conditions involving market prices 405 for each period of time in a given time interval associated with the second process; and generating the schedule of usage for the battery system from the operation constraints, the market conditions, and the effective capacity for the each period of time in the given time interval as illustrate at 401 of FIG. 4.

In another example implementation, the third process can involve adjusting charging or discharging power of the battery storage system in real-time according to the BES operation status and signals provided from the one or more operators in real-time as illustrated at 801 of FIG. 8; and while monitoring the battery status in real time, determining the SoC of the battery system as shown at 1000 of FIG. 10; and while monitoring the battery status in real-time: determining an operation control mode of the battery system corresponding to the SoC of the battery system, and to be applied based on the SoC of the battery system, the operation control mode based on the SoC of the battery system being in a normal operation range or exceeding the normal operation range as illustrated in FIG. 10. For example, if the SoC of the battery system is in the normal operation range as shown at 1001, the third process generates battery dispatching signals to the battery system to control regulation power of the battery system according to the control algorithm as shown at 1002 of FIG. 10. If the SoC of the battery system exceeds normal operation range as shown at 1003, 1004, 1005 of FIG. 10, the process generates battery dispatching signals to the battery system to control regulation power of the battery system according to the control algorithms as shown at 1007, 1008 accordingly. The battery dispatching signals can be dispatched to the battery system as accordingly.

In example implementations, the second process is executed periodically at a period that is faster than the first process. For example, the second process as shown in FIG. 4 operates at a daily period, the first process operates periodically (e.g., one week) as illustrated in FIG. 2, and the third process is operating at real time in FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A battery system management method, comprising:
    executing a first process periodically to determine an effective capacity of the battery system;
    executing a second process configured to provide a schedule of usage of the battery system to one or more operators based on the effective capacity, market conditions, and operation constraints; and
    executing a third process in real time configured to control the battery system according to the schedule, battery status measured in real time, and signals provided from the one or more operators in real-time,
    wherein the second process is executed periodically at a period that is faster than the first process, and the first process and the second process are executed at periods slower than the third process.

2. The battery system management method of claim 1, wherein the first process comprises:
    for a predetermined time interval being reached or for an abnormality being detected from one or more of estimated life cycles of the battery system and status of the battery system, determining the effective capacity of the battery system based on the estimated life cycles of the battery system and a rated battery life cycle of the battery system.

3. The battery system management method of claim 1, wherein the second process comprises:
   determining the operation constraints based on the effective capacity and capacity reservation estimation;
   obtaining the market conditions comprising market prices for each period of time in a given time interval associated with the second process; and
   generating the schedule of usage for the battery system from the operation constraints, the market conditions, and the effective capacity for the each period of time in the given time interval.

4. The battery system management method of claim 1, wherein the third process comprises:
   controlling the battery system in real time according to the battery status and the signals provided from the one or more operators in real-time;
   while monitoring the battery status in real-time:
      determining a state of charge (SoC) of the battery system in real-time, an operation control mode of the battery system corresponding to the SoC of the battery system, and, the operation control mode based on the SoC of the battery system being in a normal operation range or exceeding the normal operation range;
      generating battery dispatching signals to the battery system to control regulation power of the battery system according to a control algorithm corresponding to the determined operation control mode; and
      dispatching the battery dispatching signals to control the regulation power of the battery system.

5. A non-transitory computer readable medium, storing instructions for executing a process to manage a battery system, the instructions comprising:
   executing a first process periodically to determine an effective capacity of the battery system;
   executing a second process configured to provide a schedule of usage of the battery system to one or more operators based on the effective capacity, market conditions, and operation constraints; and
   executing a third process in real time configured to control the battery system according to the schedule, battery status measured in real time, and signals provided from the one or more operators in real-time,
   wherein the second process is executed periodically at a period that is faster than the first process, and the first process and the second process are executed at periods slower than the third process.

6. The non-transitory computer readable medium of claim 5, wherein the first process comprises:
   for a predetermined time interval being reached or for an abnormality being detected from one or more of estimated life cycles of the battery system and status of the battery system, determining the effective capacity of the battery system based on the estimated life cycles of the battery system and a rated battery life cycle of the battery system.

7. The non-transitory computer readable medium of claim 5, wherein the second process comprises:
   determining the operation constraints based on the effective capacity and capacity reservation estimation;
   obtaining the market conditions comprising market prices for each period of time in a given time interval associated with the second process; and
   generating the schedule of usage for the battery system from the operation constraints, the market conditions, and the effective capacity for the each period of time in the given time interval.

8. The non-transitory computer readable medium of claim 5, wherein the third process comprises:
   controlling the battery system in real time according to the battery status and the signals provided from the one or more operators in real-time;
   while monitoring the battery status in real-time:
      determining a state of charge (SoC) of the battery system in real-time, an operation control mode of the battery system corresponding to the SoC of the battery system, the operation control mode based on the SoC of the battery system being in a normal operation range or exceeding the normal operation range;
      generating battery dispatching signals to the battery system to control regulation power of the battery system according to a control algorithm corresponding to the determined operation control mode; and
      dispatching the battery dispatching signals to control the regulation power of the battery system.

9. An apparatus configured to manage a battery system, the apparatus comprising:
   a processor, configured to:
      execute a first process periodically to determine an effective capacity of the battery system;
      execute a second process configured to provide a schedule of usage of the battery system to one or more operators based on the effective capacity, market conditions, and operation constraints; and
      execute a third process in real time configured to control the battery system according to the schedule, battery status measured in real time, and signals provided from the one or more operators,
      wherein the second process is executed periodically at a period that is faster than the first process, and the first process and the second process are executed at periods slower than the third process.

10. The apparatus of claim 9, wherein the first process comprises:
    for a predetermined time interval being reached or for an abnormality being detected from one or more of estimated life cycles of the battery system and status of the battery system, determining the effective capacity of the battery system based on the estimated life cycles of the battery system and a rated battery life cycle of the battery system.

11. The apparatus of claim 9, wherein the second process comprises:
    determining the operation constraints based on the effective capacity and capacity reservation estimation;
    obtaining the market conditions comprising market prices for each period of time in a given time interval associated with the second process; and
    generating the schedule of usage for the battery system from the operation constraints, the market conditions, and the effective capacity for the each period of time in the given time interval.

12. The apparatus of claim 9, wherein the third process comprises:
    controlling the battery system in real time according to the battery status and the signals provided from the one or more operators in real-time;
    while monitoring the battery status in real-time:

determining a state of charge (SoC) of the battery system in real-time, an operation control mode of the battery system corresponding to the SoC of the battery system, the operation control mode based on the SoC of the battery system being in a normal operation range or exceeding the normal operation range;

generating battery dispatching signals to the battery system to control regulation power of the battery system according to a control algorithm corresponding to the determined operation control mode; and dispatching the battery dispatching signals to control the regulation power of the battery system.

* * * * *